J. L. SHEPPARD.
APPARATUS FOR RESHAPING AND COMPRESSING PLANTATION COTTON BALES.
APPLICATION FILED JUNE 2, 1913.

1,096,397.

Patented May 12, 1914.
6 SHEETS—SHEET 1.

WITNESSES

INVENTOR
J. L. Sheppard
Attorney

J. L. SHEPPARD.
APPARATUS FOR RESHAPING AND COMPRESSING PLANTATION COTTON BALES.
APPLICATION FILED JUNE 2, 1913.

1,096,397.

Patented May 12, 1914.

J. L. SHEPPARD.
APPARATUS FOR RESHAPING AND COMPRESSING PLANTATION COTTON BALES.
APPLICATION FILED JUNE 2, 1913.

1,096,397.

Patented May 12, 1914.

J. L. SHEPPARD.
APPARATUS FOR RESHAPING AND COMPRESSING PLANTATION COTTON BALES.
APPLICATION FILED JUNE 2, 1913.

1,096,397.

Patented May 12, 1914.

WITNESSES

INVENTOR
J. L. Sheppard
By H. A. Seymour
Attorney

UNITED STATES PATENT OFFICE.

JOHN L. SHEPPARD, OF CHARLESTON, SOUTH CAROLINA, ASSIGNOR TO AMERICAN HIGH DENSITY COMPRESS CORPORATION, OF CHARLESTON, SOUTH CAROLINA, A CORPORATION OF SOUTH CAROLINA.

APPARATUS FOR RESHAPING AND COMPRESSING PLANTATION COTTON-BALES.

1,096,397. Specification of Letters Patent. Patented May 12, 1914.

Application filed June 2, 1913. Serial No. 771,273.

*To all whom it may concern:*

Be it known that I, JOHN L. SHEPPARD, of Charleston, in the county of Charleston and State of South Carolina, have invented certain new and useful Improvements in Apparatus for Reshaping and Compressing Plantation Cotton-Bales; and I do hereby declare the following to be a full, clear, and exact description of the invention, such as will enable others skilled in the art to which it appertains to make and use the same.

My invention relates to improvements in apparatus for reshaping and compressing plantation cotton bales, the object being to provide means for reducing the plantation bales to uniform size as to length and width, and compressing and tying the same, and with this end in view my invention consists in the parts and combination of parts as will be more fully described and pointed out in the claims.

In the accompanying drawings, Fig. 4ª is a view showing parts of the top and bottom plates and one end of the rear plate or wall.

Figure 1:
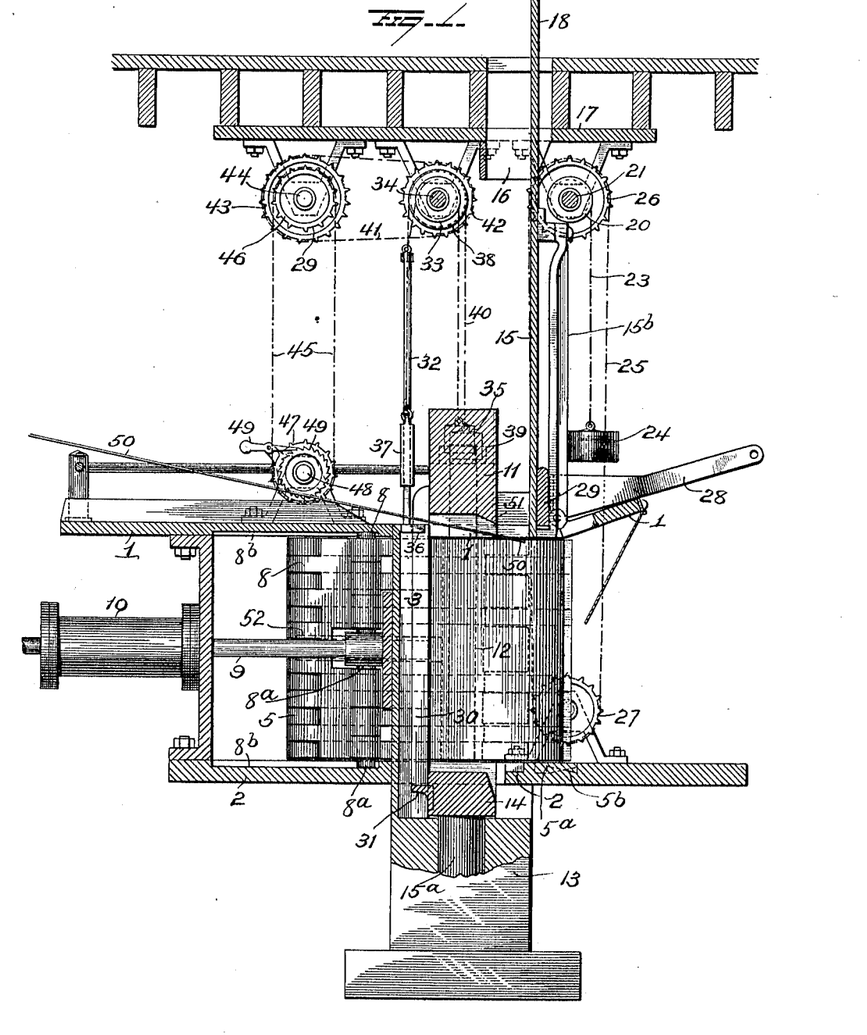
Figure 1 is a view in vertical section of an apparatus embodying my invention.
Figure 2:
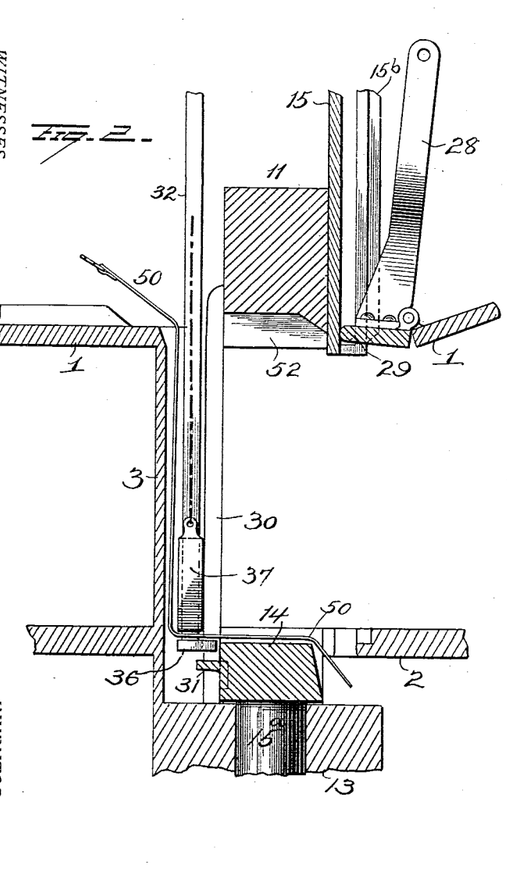
Fig. 2 is a view in section showing the bale bands placed for the introduction of a plantation bale.

My apparatus comprises top and bottom plates 1 and 2, the front end of the top plate 1 being turned upwardly as shown in Fig. 1, and a rear plate or wall 3, extending vertically between the top and bottom plates and rigidly secured to both and also to the upper platen 11 and to the foundation below the bottom plate as shown in Fig. 1. This rear plate or wall is provided at its side edges with a series of horizontal integral parallel fingers 4 which rest in correspondingly located slots or grooves in the reshaping jaws 5. By this arrangement the back wall 3 of the reshaping and compressing chamber will close the space between the jaws, when the latter are open and also when closed, without interfering in the slightest with the free opening and closing movements of the jaws.

Figure 5:
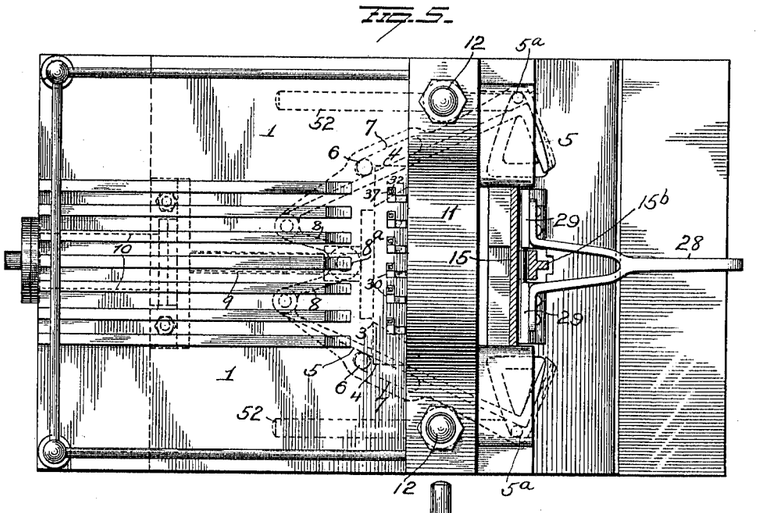
Fig. 5 is a view in plan partly in section.
Figure 6:
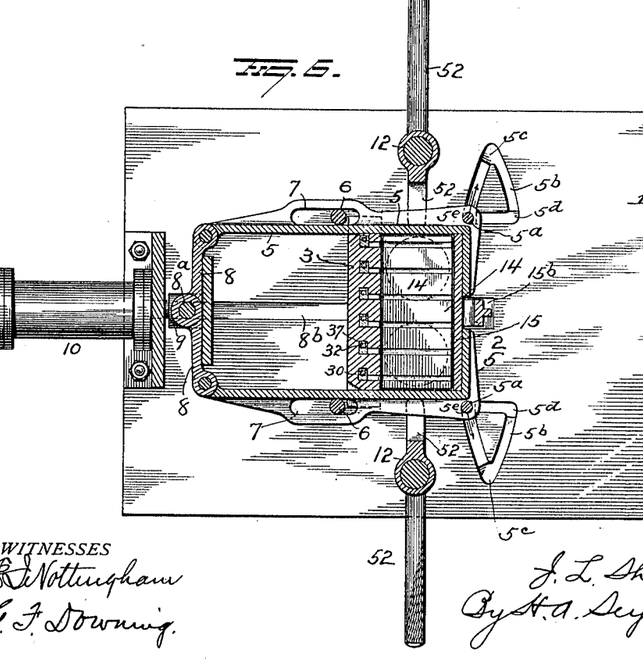
Fig. 6 is a view in horizontal section.
Figure 11:
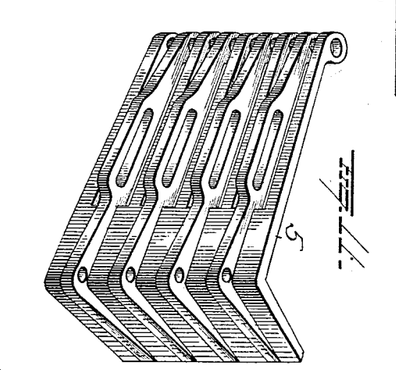
Fig. 11 is a view in perspective of one of the jaws of the reshaping press.

Secured to and connecting the plates 1 and 2, are the posts 6, on which the jaws 5 are mounted. The jaws are substantially L-shape as shown in Figs. 6 and 11, and each is provided on its outer face with a series of strengthening ribs, slotted as shown in Fig. 11 for the passage of the posts 6, the said posts acting as fulcrums on which the jaws turn and also have endwise sliding movement as hereinafter explained. The jaws are as wide as the space between plates 1 and 2, and are connected at their rear ends to the toggle levers 8, which latter are centrally secured to the front end of the plunger 9. This plunger, which may be actuated by steam or water in the well known manner, preferably extends through the rear end of cylinder 10, so as to guide the plunger and prevent undue wear on the gland at the front end of the cylinder. The front or free ends of the jaws 5, are at right angles to the main bodies of the jaws, and when open, as shown in dotted lines in Fig. 5, are separated sufficiently to permit of the entrance of the longest plantation bale.

Located above an opening in the upper plate, 1, is the upper platen 11 secured to the posts or standards 12, which latter are also secured to the lower plate 1 and preferably to the base carrying the cylinders 13. The cylinders 13 are in a plane below the lower plate 2, and the latter is provided with an opening for the reception and passage of the movable compress platen 14, carried by the plungers 15ª mounted in cylinders 13. The openings in the upper and lower plates 1 and 2, for the platens 11 and 14, are immediately in front of the rear plate or wall 3 of the press chamber.

Movably mounted in the upper platen, in front of the top platen 11, is the vertically sliding gate 15 having an upwardly projecting tongue 18, mounted in suitable guides or supports, which in the present instance are brackets 16, secured to the ceiling 17, of the compress room, or to a suitable frame over the compress, the said ceiling or frame 17, having an opening for the passage and free swinging movement of the upper end of said tongue 18. This gate is suspended from chains or cables 19, adapted to be wound on drums 20 on shaft 21, which shaft also carries drum 22 on which the chain 23 carrying the counterweight serving to counterbalance the gate is wound so that but nominal power will be required to actuate the shaft to raise and lower the gate. The gate may be worked by the endless chain 25 which passes around sprocket 26 on shaft 21, the said chain also passing around sprocket 27 mounted in bearings on the lower plate 2, so as to carry the actuating chain down within reach of an operator standing on plate 2 in front of the compress chamber.

28 is a lever rigidly secured to the cam 29, the latter being journaled at its front edge to the plate 1, and provided with a slot for the passage of the guide finger $15^b$ rigidly secured at its ends to the gate 15. With this construction when the gate is free to swing, by pulling the lever downwardly, the gate will be pulled forwardly so as to free itself of, or rest clear of the bale, and by pushing the lever up the gate will be forced rearwardly toward the bale. Normally the gate hangs in a vertical plane beyond the front edge of a plantation bale in the compress so that it may be freely lowered in front of the bale.

The rear wall 3 of the compress chamber is provided with a series of vertical slots 30 open at the front, and the plunger 14 is provided on its rear face with a series of rearwardly projecting tongues 31 which rest and move in said slots 30. There is a slot 30 for each bale band used, and in the present instance I have shown six, which is the number usually employed. 32 are a series of rods or posts, one for each slot 30, mounted to move vertically in said slots. The rods 32 are connected at their upper ends and the entire series is suspended from a chain or cable passing over a loose sheave 33, on shaft 34, the said chain carrying at its other end a counterweight 35 which is slightly heavier than the rods and which tends constantly to hold the rods in their elevated positions. Each rod is provided at its lower end with a foot 36 which project into the slots sufficiently to be engaged by the tongues 31 on the platen 14, so that, as the latter rises, the rods 32 will also be elevated.

Mounted on each rod 32 is a bale band clamping sleeve 37, adapted to have a free vertical movement within certain limits, on its rod. Each sleeve 37 is suspended from a chain which passes over a drum 38 fast on shaft 34, the latter carrying a counterweight 39 suspended from a chain 40. The counterweight 39 is of less weight than the combined weights of the several sleeves 37, but partly counterbalances the entire series, so that but little power is required by the operator to elevate them, which may be conveniently done by the sprocket chain 41, passing around sprocket 42 on shaft 34, and around sprocket 43 on shaft 44, and sprocket chain 45 passing around sprocket wheel 46 on shaft 44 and around sprocket 47 on shaft 48, the said shaft carrying a ratchet wheel, which when engaged by the pawl 49, will prevent the rotation of shaft 48 and thus hold the sleeves 37 suspended. By releasing the pawl, the weight of the sleeves will cause the latter to drop and carry with them the rods 32, and by pulling on chain 45 in a direction to draw up the sleeves, the rods will be pulled up by their counterweights which as before explained overbalance the rods.

The toggle joint 8 of the jaws 5 are caused to move in a straight line back and forth by the pin $8^a$ connecting the levers 8, moving in grooves $8^b$ in the top and bottom plates, and the outer ends of the jaws are guided in their movements by the pins $5^a$ moving in the triangular grooves $5^b$ in said top and bottom plates, as clearly shown in Figs. 5 and 6.

In the operation of the apparatus the gates 5 are opened to the position as shown in dotted lines in Fig. 5, and the lever 28 thrown upwardly to get it out of the way. The lower platen 14 is down, to, or slightly below the plane of the upper face of the lower plate 2, and the rods 32, sleeves 37 and gate 15 are in their elevated positions as shown in Fig. 1. The bale bands 50 are then passed over the feet 36 on the lower ends of the rods 32 as shown in Fig. 1, and fed forwardly through the grooves 52 in upper platen 11 until stopped by the abutments 51 on the upper platen. The sleeves 37 are now lowered onto the bands 50 and the weights thereof carry the rods 32 and the bands downwardly onto and into the grooves in the upper face of the lower platen 14, the free end of the band projecting downwardly and obliquely in front of said lower platen. The plantation bale stripped of its bands is now placed within the reshaping and compressing chamber, after which the lever 28 is thrown down to its forward position as in Fig. 1, so as to release the gate and permit the latter to have a free forward movement so as to hang, or be movable in a plane in front of the bulging side of the plantation bale. After gate 15 has been lowered in front of the bale, and the jaws 5 closed onto the same, the jaws move rearwardly and carry the gate with it, and this rearward movement of the gate turns the cam 29 to its horizontal position thus locking the upper end of the gate against the top platen or other part of the frame. The jaws, in closing, move inwardly or toward each other and slightly forwardly, this movement being controlled by the pins $5^a$, in the jaws 5, moving from the outer points 5ᶜ in the triangular guide slots 5ᵇ, to the point 5ᵈ. During this movement of the jaws, the inwardly projecting ends of the latter close over the gate 15 and in the rearward movement of the jaws from the point 5ᵈ to the point 5ᵉ, they engage the gate and carry the latter rearwardly into contact with the plantation bale.

The jaws 5 of the reshaping press are actuated by the rearward movement of plunger 9. At the commencement of the operation, the jaws 5 are in the position shown in dotted lines in Fig. 5. As the plunger begins its rearward movement, the toggle levers 8 straighten out, thus simply rocking the jaws on their fulcrums 6, and it is during this rocking movement that the guide pins 5ᵃ of the jaws, move within the triangular guiding slots from the point 5ᶜ to the point 5ᵈ. After the toggle levers 8 have straightened out, as in Fig. 6, the continued rearward movement of the plunger 9, carries the jaws rearwardly, the guiding pins during this movement of the jaws, moving from the point 5ᵈ to the point 5ᵉ. The closing of the jaws shortens up the plantation bales to uniform length, and the rearward movement draws in the bale sidewise to uniform width without materially compressing the same, as there is ample room above for the cotton to rearrange itself within the reshaping chamber.

Figure 3:
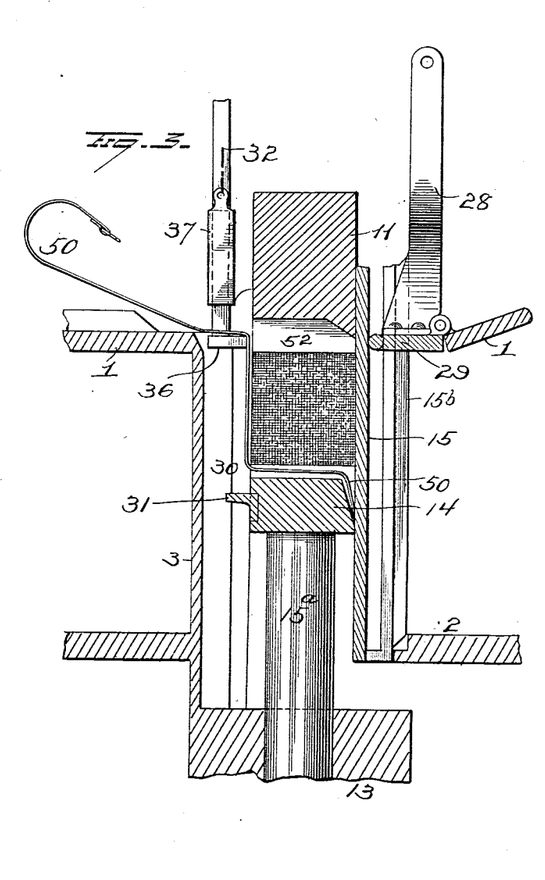
Fig. 3 is a similar view showing the bale compressed.
Figure 4:
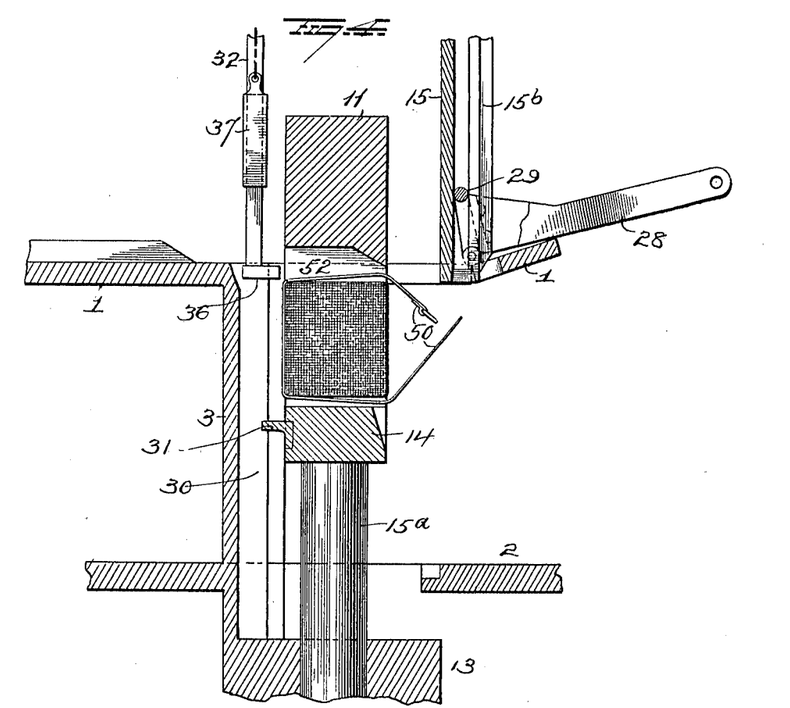
Fig. 4 is a view showing the buckle or tie ends of the band passed through to the front and exposed for locking.
Figure 4A:
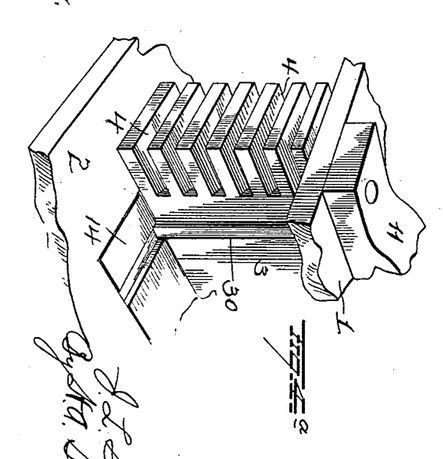
Figure 7:
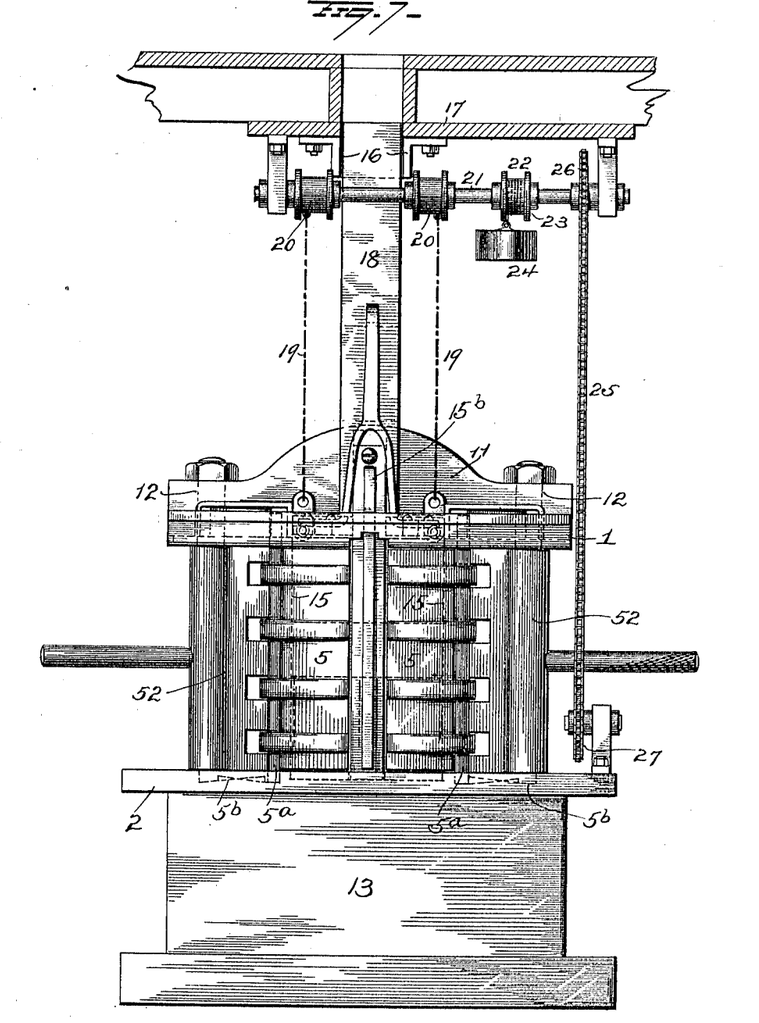
Fig. 7 is a view in front elevation of the apparatus showing the jaws of the reshaping press closed.
Figure 8:
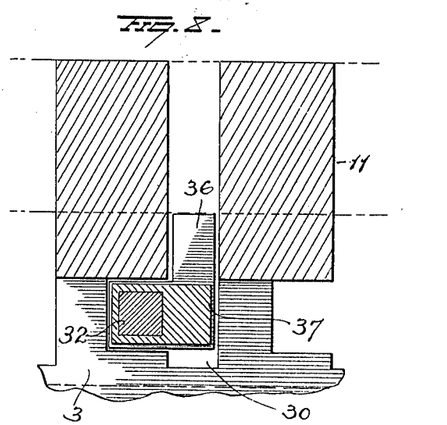
Figs. 8, 9 and 10 are views of the devices which carry the bale band down to the lower platen
Figure 9:
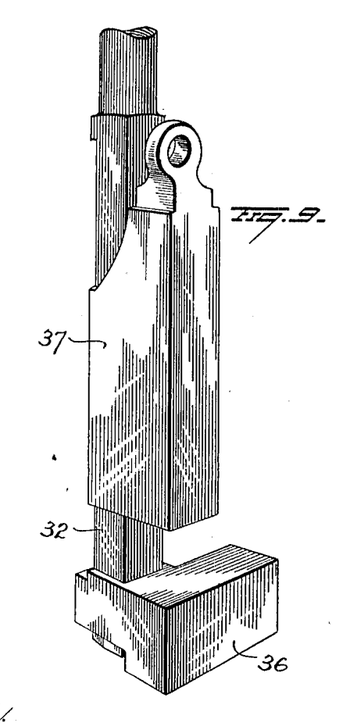
Figure 10:
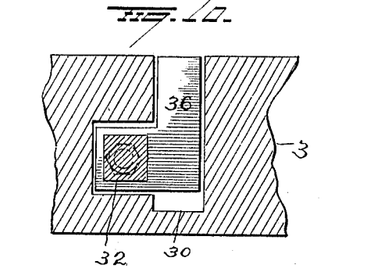

In closing, the jaws overlap the gate 15 and in the rearward movement of the jaws the gate is carried with same and forms in effect the front wall of the reshaping and compressing chamber. After the bale has been thus reshaped, the jaws are locked by the levers 52, shown in Figs. 6 and 7. These levers are mounted to turn, and in the present instance are shown as mounted on the posts or standards 12 carrying the upper platen 11 of the compress and when turned to the position shown in Figs. 6 and 7, bear against the jaws 5 near their free ends, and throughout the width of the jaws, thus locking the latter against any opening movement and also supporting them during the compression of the bales, and until the bale has been fully compressed. After the jaws have been closed and locked as above explained, the lower platen 14 is elevated, thus carrying the bale upwardly and into contact with the upper platen, and it also carries the bands up with it, as shown in Fig. 3. After the bale has been compressed as in Fig. 3, the jaws 5 are released and opened, and the gate 15 elevated, thus leaving the bale, while still under compression, exposed at the front, as in Fig. 4. The ends of the bands carrying the buckles or bale ties are now fed through the grooves in the upper platen over the bale, thus exposing the ends of the bands at the front. After the bands have been tied, the platen 14 is lowered, thus releasing the bale and permitting it to be removed, and leaving the apparatus in condition to receive the bands for the next bale, after which the operation is repeated. With this apparatus, plantation bales of any length and width may be quickly reshaped, that is, so reduced in length and width as to make compression to the maximum of density possible in the minimum of time, without rebanding the bale after reshaping. The parts are compact and strong, and the construction is such, that, when the reshaping jaws are closed onto the bale and locked, they form a compact compress box, rigid and strong, hence the maximum of density may be safely obtained.

It is evident that many slight changes might be resorted to in the relative arrangement of parts shown and described without departing from the spirit and scope of my invention. Hence I would have it understood that I do not wish to confine myself to the exact construction and arrangement of parts shown and described but Having fully described my invention what I claim as new and desire to secure by Letters-Patent, is:—

1. In apparatus for reshaping and compressing plantation cotton bales, the combination of a pair of L-shaped jaws mounted to have opening, closing and longitudinally sliding movements, a rear wall or plate located between said jaws and provided at its side edges with a series of parallel fingers which register with slots in the jaws, and means for actuating said jaws.

2. In apparatus for reshaping and compressing plantation cotton bales, the combination of a pair of L-shaped jaws mounted to have a rocking and longitudinal sliding movement, and forming the sides and front walls of a press chamber, a fixed rear wall located between said jaws and provided at each side with a series of integral parallel fingers adapted to enter slots in the bodies of the jaws, toggle levers connecting said jaws at the rear end and means for actuating said toggle levers.

3. In apparatus for reshaping and compressing plantation cotton bales, the combination with upper and lower platens, one of which is movable, of a pair of pivoted L-shaped jaws adapted when closed to form walls of the press chamber intermediate the two platens, and means engaging the outer faces of said jaws for locking and supporting them during the operation of compressing a bale.

4. In apparatus for reshaping and compressing plantation cotton bales, the combination with upper and lower platens, of a pair of L-shaped jaws adapted to swing horizontally and be moved longitudinally, a fixed rear wall intermediate said jaws, the said rear wall and jaws, adapted to form walls of the press chamber intermediate the two platens, and external means for locking said jaws in their closed positions.

5. In apparatus for reshaping and compressing plantation cotton bales, the combination with upper and lower platens, of a pair of L-shaped jaws adapted to swing horizontally and be moved longitudinally, a fixed rear wall intermediate said jaws and a vertically sliding gate adapted to form the front wall of the press chamber the said gate being supported at the front by the right angled ends of the L-shaped jaws.

6. In apparatus for reshaping plantation cotton bales, the combination with two L-shaped jaws mounted to swing horizontally and be moved longitudinally, of a vertically movable gate adapted to be lowered to rest in front of the bent ends of the jaws and have a rearward movement with said jaws.

7. In apparatus for reshaping plantation cotton bales, the combination with two L-shaped jaws adapted to swing horizontally and be moved longitudinally and a rear wall intermediate said jaws, of a vertically movable counterweighted gate adapted to be lowered to the plane of the jaws, and be inclosed by the latter, and means for moving the jaws and gate rearwardly.

8. In apparatus for reshaping plantation cotton bales, the combination with a pair of L-shaped jaws, means for moving the jaws toward and from each other and for moving them longitudinally, a rear wall intermediate said jaws, a vertically sliding gate adapted to rest intermediate the jaws at the front ends of the latter and be moved rearwardly with said jaws, and means independent of said jaws for locking the upper end of the gate against outward pressure during compression.

9. In apparatus for reshaping plantation cotton bales, the combination of platens forming the top and bottom of a press chamber, movable jaws forming two sides or ends of said chamber, a fixed wall forming the rear and a vertically sliding gate forming the front wall of said chamber.

10. In apparatus for reshaping plantation cotton bales, a press chamber composed of upper and lower platens, a rear fixed wall, pivoted and longitudinally movable jaws, and a vertically movable gate or front wall, the said gate adapted to be moved with the jaws in their longitudinal movement.

11. In apparatus for reshaping and compressing plantation cotton bales, the combination of two platens, two L-shaped jaws forming part of the press chamber, a vertically movable gate for engaging the front face of the bale and means for engaging the jaws for holding them in their closed position.

12. In apparatus for reshaping and compressing plantation cotton bales, the combination of two platens, two L-shaped jaws, adapted when closed to form walls of the compression chamber, and means engaging said jaws throughout their depth, adjacent their front ends for supporting them during the compressing operation.

13. In apparatus for reshaping and compressing plantation cotton bales, the combination of two platens, a fixed rear wall, two L-shaped jaws located adjacent the opposite ends of said rear wall, and two pivoted levers adapted when turned to engage the outer faces of the jaws and lock them against separation and also for supporting them during the compressing operation.

14. The combination with upper and lower platens and a grooved rear wall, of a rod for each groove in said rear wall, means on the rod for supporting a bale band, and means coacting with said supporting means for holding the band on the latter, whereby when the supporting means are lowered, the band will be carried down to the lower platen.

15. The combination with upper and lower grooved platens and a rear wall having grooves in line with the grooves in the platens, of a vertically movable rod for each groove, each rod having means for supporting a bale band thereon, and means movable on the rod and adapted to engage the band for holding the latter in place while the rod is being lowered.

16. The combination with upper and lower grooved platens, and a rear wall also grooved, of a series of vertically movable rods, one for each groove in the rear wall, bale band supporting means on each rod, means for holding the bands on said supporting means, means for lowering the rods and bands, and means on the lower platen for engaging the rods and lifting them during the lifting movement of the lower platen.

17. The combination with upper and lower platens, and a rear wall the latter having a groove for each bale band, of a vertically movable rod for each groove, means for lowering the rods simultaneously and means on the lower platen for lifting them.

18. The combination with upper and lower plates, and a rear grooved wall, of a series of movable rods adapted to move in said grooves, each rod having means for supporting and carrying the bale band, means for lowering said rods simultaneously and means on the lower platen for raising them.

19. The combination with upper and lower platens, and a rear grooved wall, of a series of movable counterweighted rods each rod having a support for the bale band, a weighted sleeve on each rod for holding the band on said support, and means for lifting and lowering said sleeves on the rods.

20. The combination with upper and lower platens and rear grooved wall, of a series of bale bands carrying rods, a vertically movable sleeve on each rod, the said sleeves adapted to hold the bands in place and cause them to descend with the rods and means for lowering the rods and sleeves.

21. The combination of upper and lower platens grooved on their inner faces, opening and closing L-shaped jaws, a fixed rear wall intermediate the jaws and a vertically movable bale band carrying devices located above the fixed rear wall and adapted to carry the bands down to and seat them in the grooves in the lower platen.

22. The combination of upper and lower platens, pivoted and longitudinally movable L-shaped jaws, a rear wall intermediate said jaws, means for opening and closing the jaws, and a vertically movable gate adapted to form a closure for the front ends of the jaws.

In testimony whereof, I have signed this specification in the presence of two subscribing witnesses.

JOHN L. SHEPPARD.

Witnesses:
MARIE R. SIMONS,
DANIEL GILLILAND SHEPPARD.

---

Copies of this patent may be obtained for five cents each, by addressing the "Commissioner of Patents, Washington, D. C."